United States Patent [19]

Inagami et al.

[11] 4,061,792

[45] Dec. 6, 1977

[54] METHOD OF MANUFACTURING A BEVERAGE CONTAINING FRUIT INGREDIENTS

[75] Inventors: Kaoru Inagami, Tokyo; Isamu Mitsui, Yokohama; Chomatsu Nakamura; Toru Nozaka, both of Tokyo, all of Japan

[73] Assignee: Calpis Shokuhin Kogyo Kabushiki Kaisha, Tokyo, Japan

[21] Appl. No.: 639,435

[22] Filed: Dec. 10, 1975

Related U.S. Application Data

[63] Continuation of Ser. No. 448,992, March 7, 1974, abandoned, which is a continuation of Ser. No. 206,450, Dec. 9, 1971, abandoned.

[30] Foreign Application Priority Data

Dec. 17, 1970 Japan .................................. 45-112855
Oct. 19, 1971 Japan .................................. 46-082097

[51] Int. Cl.$^2$ ........................... A23L 2/30; A23L 2/00
[52] U.S. Cl. ............................... 426/330.2; 426/330.3; 426/330.5; 426/584; 426/599
[58] Field of Search ............... 426/330.2, 330.3, 330.5, 426/590, 599, 422, 330, 50, 584, 51, 580, 656, 657, 540

[56] References Cited

U.S. PATENT DOCUMENTS 1,814,994  7/1931  Wilson et al. .................... 426/590 X
1,870,588  8/1932  Rooker et al. ..................... 426/51 X
2,860,987  11/1958  Werner ......................... 426/330.5 X
3,174,865  3/1965  Johnston et al. .................. 426/330.2
3,788,862  1/1974  Hoover et al. ....................... 426/540
3,830,942  8/1974  Hawley ........................... 426/590 X

OTHER PUBLICATIONS

Saburov et al., "Clarification of Fruit Juices", Chem. Abstracts, vol. 27, p. 5835;1933.
D. K. Tressler et al., Fruit & Vegetable Juice Processing Technology; pp. 98–100; 1961; The Avi Publishing Co., Westport, Conn.

Primary Examiner—S. Leon Bashore
Assistant Examiner—Kenneth M. Schor
Attorney, Agent, or Firm—Stevens, Davis, Miller & Mosher

[57] ABSTRACT

A beverage is made by removing pectic substances and tannin from fruit juice or fruit extract by addition of an acidified solution of protein having a pH not exceeding 3.7. The pectic substances and tannin interact with the acidified solution of protein and are removed as coagulum. If desired, the fruit juice or extract may be pretreated with pectinase. The resultant fruit juice or fruit extract may be mixed with an acidified solution of protein such as acidified skim milk without further formation of coagulums so that a stable beverage is obtained.

The proteins used for removing pectic substances and tannin are preferably derived from milk but vegetable proteins may also be used.

4 Claims, No Drawings

METHOD OF MANUFACTURING A BEVERAGE CONTAINING FRUIT INGREDIENTS

BACKGROUND OF THE INVENTION

This is a continuation of application Ser. No. 448,992, filed Mar. 7, 1974, which is a continuation of Ser. No. 206,450, filed Dec. 9, 1971, both now abandoned Fruit juice or fruit extract contains pectic substances and/or tannin. When they are mixed with an acidified solution of a protein, the protein contained in the solution combines with the pectic substances and/or tannin and quickly separates from the solution and sediments in the form of coagulums.

In order to prevent this coagulation, it has heretofore been a popular practice to hydrolize and separate in advance pectic substances present in fruit juice or fruit extract used for the production of beverage by using a suitable pectinase and to remove tannin by adding gelatine. A sufficient hydrolysis and removal of pectic substances, however, cannot be achieved with pectinase. Thus, it is inevitable for the treated fruit juice to contain residual pectic substances. Further a sufficient removal of the tannin can not be effected merely by adding gelating solution as suggested by the known methods. Therefore it is quite natural that the coagulation and separation should occur when fruit juice is mixed with an acidified solution of protein.

With a view to eliminating such drawbacks, the present inventors carried out experiments to elucidate the causes of the drawbacks of the conventional methods.

SUMMARY OF THE INVENTION

It is the principal object of this invention to provide a method for the manufacture of a milk beverage containing a natural fruit juice or fruit extract, which beverage retains the flavor and is color tone of the natural fruit juice or fruit extract and free from the phenomenon of coagulation and separation of proteins that tend to occur upon mixing fruit juice or fruit extract with an acidified solution of protein, especially with acidified milk.

DETAILED DESCRIPTION OF THE INVENTION

According to the present invention, there is provided a new method which comprises adding an acidified solution of a protein having a pH value not exceeding 3.7 to the fruit juice or fruit extract, then coagulating and separating the tannin and/or pectic substances through a sufficient reaction with the solution, and thereafter, removing the resultant coagulums. Preferably, the pectic substances should be hydrolized with pectinase beforehand.

Neither the separation nor the sedimentation occurs in fruit juice or fruit extract that has undergone the above-mentioned treatment, even while it is being mixed with further acidified solution of protein. From such fruit juice or fruit extract can be made a beverage with improved qualities, which remains stable for a long period with little precipitation.

The method of this invention is specifically described below in comparison with the known method which aims to remove tannin and/or pectic substances from fruit juice or fruit extract by adding a gelating solution.

A neutral solution of proten has generally been used to remove tannin from the solution containing the tannin. However, an acidified solution of protein with a pH value within a specific range has never been used to remove such substances as tannin or pectic substances which is contained in the fruit juice or fruit extract and coagulates with protein particles.

In a conventional method, a thermally dissolved gelatin solution is added to fruit juice or fruit extract which has been treated in advance with a pectinase. The gelatin reacts with tannin and pectic substances to form white suspended particles, which coagulate and settle at the bottom of container. Thus, it has so far been believed that the tannin and the pectic substances can be removed effectively from the fruit juice or fruit extract by this method.

However, when the juice treated by the conventional method was analyzed by the Follin Denis method and the colloidal titration method, after removing the coagulums, it was found that only small amounts of tannin and pectic substances were removed, as shown in Table 1 of Experiment 1. The result shows that the gelatin itself coagulated and sedimented forming sedimenting coarse particles at its isoelectric point and that the gelatin is hardly caused to react with the tannin and the pectin substances, although the coagulation in the juice was observed. The following fact will serve as an explanation of this phenomenon. When an acidified solution of gelatin with a pH value of 2.8 is added to fruit juice or fruit extract having a pH value from 2.8 to 3.5, gelatin remains dissolved and the solution hardly becomes turbid, having a high isoelectric point and further the amount of residual tannin and/or pectic substances remained substantially unchanged.

When a weak alkaline solution of milk protein was added to fruit juice or extract, the formation and coagulation of sedimenting coarse particles was observed, because milk protein passed the isoelectric point of casein (pH 4.6) as in the case of the neutral solution of milk protein, but the gelatin hardly combined with the tannin and the pectic substances.

When the solution or suspension of milk protein having a pH value not exceeding 3.7, which was obtained by heating, was added to fruit juice or extract, the protein suspended in colloidal particles did not pass the isoelectric point as casein and so combined with the tannin and pectic substances so that the coagulums of the protein-tannin and protein-pectic substances were well formed and sedimented. Consequently, very little of free tannin and pectic substance remained in the solution.

The amount of an acidified solution of protein should be selected in due proportion to amount of the tannin and the pectic substances contained in the fruit juice or extract. If an insufficient amount of the acidified solution of a protein solution is added, then residual amount of the tannin and the pectic substances will naturally remain unchanged. On the contrary, if the acidified solution of protein is added in an excessive amount and the protein happens to be gelatin, the gelatin will impede rather than promote the sedimenting of coagulums because it inherently functions as a protective colloid. Thus, the addition of the acidified solution of gelatin in an extensive amount fails to accomplish the desired removal of tannin and the pectic substances. If milk protein is used instead of gelatin, it hardly forms a protective colloid in the pH range of fruit juice of from 2.8 to 3.5. Therefore, the excessive addition of the acidified solution of milk protein offers no particular impediment to the coagulation and the sedimentation.

The addition of an acidified solution of milk protein is an effective means for the formation of tannin-protein coagulums and pectin-protein coagulums. Where the fruit juice has much lower pH value or where the formation of coagulums is not sufficient, the coagulation and the sedimentation can be accelerated by incorporating a small amount of such protein coagulant as alum or magnesium sulfate into the fruit juice being treated. The term "fruit juice" "fruit extract" as used in this invention refers to those derived from fruits in a broad sense of the word, including for example not merely grapes, apple, plum and raspberry but equally pineapple, strawberry, tomato and so forth. The present invention is effective for the production of a sour beverage containing the juice or the extract derived from these fruits in which the pectic substances or the tannin are contained.

The acidified solution of milk protein to be added to the fruit juice according to the present invention includes those solutions which are obtained by dissolving milk powder, condensed skim milk or cheese in a solution acidified with at least one acid selected from the group consisting of citric acid, lactic acid, tartaric acid, malic acid, succinic acid, fumaric acid, gluconic acid, and phosphoric acid. The acidified solutions should be made so as to have a pH value not exceeding 3.7, preferably in the range of from 2.0 to 3.5.

An acidified solution of vegetable protein as of soybean, peanut, sesame seed, or wheat flour may also be used as an acidified solution of a protein for the purpose of this invention, although they are inferior in its effect to an acidified solution of milk protein. The acidified solution of vegetable protein is used in the same way as an acidified solution of milk protein. The protein content in the acidified solution of protein is not specifically limited. In other words the protein can be added in any content so long as it throughly dissolves in the solutions.

The coagulums are formed when an acidified solution of protein is added to the fruit juice or extract containing the tannin or the pectic substances. The removal of the formed coagulums from the mixture may be accomplished by the well-known centrifugation or filtration method.

And then, the treated fruit juice or extract is blended with a further acidified solution of a protein, of which pH range need not be limited.

The present invention may be understood in more detail from experiments conducted by the inventors.

EXPERIMENT 1

The juice of grape was treated in advance with a pectinase and then subjected to different kinds of treatments. The results are given in Table 1. The removal of coagulums was carried out by the centrifugation method. This grape juice for this experiment contained 0.19 % by wt. tannin and 0.034 % by wt. pectic substances. To this juice, various proteins were added in such amounts to give the concentration of 0.15 % by weight in each case.

Table 1

| Protein solution (pH of solution) | pH of juice | Degree of coagulation on addition of a protein | Amount of residual tannin (%) (by wt.) | Amount of residual pectic substances (by wt.) |
|---|---|---|---|---|
| 1. Gelatin solution (pH 6.0) | 3.5 | ++ | 0.16 | — |
|  | 3.3 | ++ | 0.17 | 0.028 |
|  | 3.1 | ± | 0.17 | — |
|  | 2.9 | — | 0.17 | — |
|  | 3.5 | + | 0.14 | — |
| 2. Acidified solution of gelatin (pH 3.8) | 3.3 | — | 0.16 | 0.025 |
|  | 3.1 | — | 0.17 | — |
|  | 2.9 | — | 0.17 | — |
|  | 3.5 | ++ | 0.07 | — |
| 3. Casein solution (pH 6.6) | 3.3 | ++ | 0.11 | 0.020 |
|  | 3.1 | ++ | 0.12 | — |
|  | 2.9 | + | 0.14 | — |
|  | 3.5 | +++ | 0.02 | — |
| 4. Acidified solution of casein (pH 2.8) | 3.3 | +++ | 0.02 | 0.009 |
|  | 3.1 | +++ | 0.03 | — |
|  | 2.9 | ++ | 0.05 | — |
|  | 3.5 | ++ | 0.07 | — |
| 5. Alkaline solution of skim milk (pH 9.0) | 3.3 | ++ | 0.11 | 0.021 |
|  | 3.1 | ++ | 0.12 | — |
|  | 2.9 | + | 0.14 | — |
|  | 3.5 | +++ | 0.02 | — |
| 6. Acidified solution of skim milk (pH 2.8) | 3.3 | +++ | 0.02 | 0.008 |
|  | 3.1 | +++ | 0.04 | — |
|  | 2.9 | ++ | 0.05 | — |

The table clearly shows that, as previously stated, the amounts of the residual tannin and pectic substances were small in the tests (4, 6) in which the acidified solution of casein and the skim milk were added.

EXPERIMENT 2

The fruit juice treated by the procedure of Experiment 1 was concentrated to 1/5 of the original weight. To 200 g of each concentrated juice, 150 g of lactic acid fermented milk (sour milk) with pH 3.4 and 450 g of 67 % sugar syrup were added and homogenized. The resultant homogenized liquids were bottled, thermally pasteurized and allowed to stand in a room at 20° C. The bottled liquids were visually inspected for possible formation of coagulums after indicated periods of time. The results are shown in Table 2.

Table 2

| Method of treatment | Degree of coagulation after mixture with sour milk | | |
|---|---|---|---|
|  | After 10 days' standing | After one month's standing | After 3 months' standing |
| Gelatin solution (pH 6.0) | +++ | +++ | +++ |
| Gelatin solution (pH 2.8) | +++ | +++ | +++ |
| Casein solution (pH 6.6) | +++ | +++ | +++ |
| Casein solution (pH 2.8) | — | — | — |
| Skim Milk solution (pH 9.0) | +++ | +++ | +++ |
| Skim Milk solution (pH 2.8) | — | — | — |

From the results, it can be seen that the juices treated with acidified solutions of casein and skim milk powder did not induce coagulation when they were mixed with the fermented milk. No sedimentation of coagulums was observed in the tests of these juices even after 3 months' standing.

EXPERIMENT 3

The grape juice was treated in advance with a pectinase and then subjected to different kinds of treatments. The results are shown in Table 3. The grape juice for this experiment contained 0.225 % by wt. tannin and 0.056 % by wt. pectic substances. The various proteins were added to the different samples of juice in such amounts as to give a concentration of 0.15 % (W/V %).

Table 3

| Kind of protein solution | pH of protein solution | pH of juice | Degree of coagulation on addition of protein | Amount of residual tannin(%) (by wt.) | Amount of residual pectic substances (%)(by wt.) |
|---|---|---|---|---|---|
| Casein | 6.5 | 2.9 | + | 0.17 | 0.034 |
|  | 2.6 | 2.9 | ++ | 0.06 | 0.014 |
| Gluten | 10.6 | 2.9 | + | 0.17 | 0.039 |
|  | 2.8 | 2.9 | ++ | 0.08 | 0.019 |
| Soybean protein | 6.3 | 2.9 | + | 0.20 | 0.036 |
|  | 2.6 | 2.9 | ++ | 0.14 | 0.016 |

The table shows that acidified solutions of both gluten and soybean protein were effective in removing the tannin and pectic substances, although they were somewhat inferior to the acidified solution of milk casein in effectiveness.

The present invention is further illustrated in the following Examples.

EXAMPLE 1

The acidified solution of casein (pH about 2.15) was prepared in advance by adding 20 g of sodium caseinate to 480 g of hot water at 60° C and dissolving the caseinate therein by agitation. The resultant solution was added while under agitation into 500 g of an 8 % aqueous solution of citric acid and heated at 80° C for 30 minutes for thorough dissolution.

To grape juice was added 0.1 % of pectinase, which was allowed to react with the juice at 40° C for 4 hours. Thereafter, the aforementioned acidified solution of casein was well mixed with the treated fruit juice in an amount of 5 % (W/V %) based on the juice. The mixture was allowed to stand for several minutes. The sedimented coagulums were removed from the mixture by the centrifugation. The mixture was passed through an ultra-filter of diatomaceous earth under pressure. The filtrate was concentrated under vacuum to a weight of one fifth of the original weight. Separately, a fermented milk was prepared by adding a starter of *Lactobacillus bulgaricus* to skim milk and allowing the skim milk to undergo lactic acid fermentation at 37° C for 20 hours. To 40 parts by weight of the fermented milk were added 20 parts by weight of the aforementioned concentrated grape juice and 40 parts by weight of sucrose. The fermented milk containing grape juice was produced by adding small amounts of citric acid and flavors to the resultant mixture and pasteurizing the mixture at 93° C for 15 seconds.

EXAMPLE 2

The extract obtained by extracting one part by weight of colored grape skin with one part by weight of ethanol acidified with hydrochloric acid was neutralized to pH 8.4 and then subjected to centrifugal separation. The separated extract was eliminated (stripped) of alcohol by distillation, then mixed with 5 % of the acidified solution of skim milk powder which was prepared by following the procedure of Example 1, and allowed to stand for several minutes. The sedimented coagulums formed consequently were removed by the centrifugal separation and the treatment with the ultra-filter of diatomaceous earth in the same manner as in Example 1. Separately, the acidified skim milk was prepared by combining skim milk and 0.3 % by weight of citric acid. To ten parts by weight of the acidified skim milk were added one part by weight of the aforesaid extract from the skin of grape, five parts by weight of 1/5-concentrated grape juice treated by the procedure of Example 1, and 20 parts by weight of 50 % sucrose solution. The mixture was diluted with water to a total of 100 parts by weight. Thereafter, the liquid was thermally pasteurized by an ordinary method to produce the milk beverage containing the grape extract.

We claim:

1. A method for manufacturing a fruit beverage which is obtained by blending acidified milk with grape juice or grape extract comprising:
   a. providing grape juice or grape extract containing tannin,
   b. mixing said grape juice or grape extract with an acidified solution of casein having a pH not exceeding 3.7,
   c. removing coagulums resulting from said mixing and
   d. blending said grape juice or grape extract with acidified milk.

2. The method according to claim 1 wherein said casein solution in step (b) is acidified with at least one acid selected from the group consisting of citric acid, lactic acid, tartaric acid, malic acid, succinic acid, fumaric acid, gluconic acid and phosphoric acid.

3. A fruit beverage which is coagulum-free and which remains stable for a long time which is obtained by blending acidified milk with grape juice or grape extract wherein, before blending, said grape juice or grape extract is treated as follows:
   a. providing grape juice or grape extract containing tannin,
   b. mixing said grape juice or grape extract with an acidified solution of casein having a pH not exceeding 3.7, and
   c. removing coagulums resulting from said mixing.

4. The fruit beverage of claim 3, wherein said casein solution in step (b) is acidified with at least one acid selected from the group consisting of citric acid, lactic acid, tartaric acid, malic acid, succinic acid, fumaric acid, gluconic acid and phosphoric acid.

* * * * *

UNITED STATES PATENT AND TRADEMARK OFFICE
CERTIFICATE OF CORRECTION

PATENT NO. : 4,061,792
DATED : December 6, 1977
INVENTOR(S) : INAGAMI, ET AL.

It is certified that error appears in the above-identified patent and that said Letters Patent are hereby corrected as shown below:

Column 1, line 65, change "gelating" to -- gelatin --.

Column 2, line 37, the phrase "milk protein, but the gelatin" should read -- gelatin, but the milk protein --.

Signed and Sealed this

Twelfth Day of September 1978

[SEAL]

Attest:

RUTH C. MASON
*Attesting Officer*

DONALD W. BANNER
*Commissioner of Patents and Trademarks*